(12) United States Patent
Sakai

(10) Patent No.: US 7,261,656 B2
(45) Date of Patent: Aug. 28, 2007

(54) METAL V-BELT

(75) Inventor: Hidenori Sakai, Yokohama (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 568 days.

(21) Appl. No.: 10/774,376

(22) Filed: Feb. 10, 2004

(65) Prior Publication Data

US 2004/0176202 A1    Sep. 9, 2004

(30) Foreign Application Priority Data

Mar. 6, 2003  (JP)  ............... 2003-060516
Jun. 4, 2003  (JP)  ............... 2003-159150

(51) Int. Cl.
*F16G 1/21* (2006.01)
*F16G 5/16* (2006.01)

(52) U.S. Cl. ...................... 474/242; 474/201

(58) Field of Classification Search ........ 474/242–245, 474/248–249, 201–202
See application file for complete search history.

(56) References Cited

U.S. PATENT DOCUMENTS

| | | | |
|---|---|---|---|
| 5,011,461 A | 4/1991 | Brouwers | |
| 6,045,474 A | 4/2000 | Smeets et al. | |
| 6,440,024 B1 * | 8/2002 | Kobayashi | 474/242 |
| 6,537,166 B1 | 3/2003 | Adriaenssens et al. | |
| 6,599,212 B2 * | 7/2003 | Kanokogi et al. | 474/201 |
| 6,641,471 B1 | 11/2003 | Pinheiro et al. | |
| 6,893,370 B2 * | 5/2005 | Kobayashi | 474/242 |

FOREIGN PATENT DOCUMENTS

| | | | |
|---|---|---|---|
| EP | 0 381 258 A1 | | 8/1990 |
| EP | 0994275 A1 | * | 4/2000 |
| EP | 1 031 764 A1 | | 8/2000 |
| JP | 02-236045 A | | 9/1990 |
| JP | 10-115349 A | | 5/1998 |
| JP | 10-213185 A | * | 8/1998 |
| JP | 11-125313 A | | 5/1999 |
| JP | 2000-240745 A | | 9/2000 |

* cited by examiner

*Primary Examiner*—Marcus Charles
(74) *Attorney, Agent, or Firm*—Foley & Lardner LLP

(57) ABSTRACT

An element for use in an annular metal belt (1) is disclosed. The annular metal belt (1) transmits torque between two pulleys each having a V-shaped groove. The element has a flank capable of making frictional contact with the V-shaped groove for transmission of torque. A plurality of threads are disposed on the flank substantially in parallel to one another. The threads has a slight height relative to a dimension of the flank, and the top section of each thread is substantially planar.

8 Claims, 7 Drawing Sheets

FIG. 4A  FIG. 4B

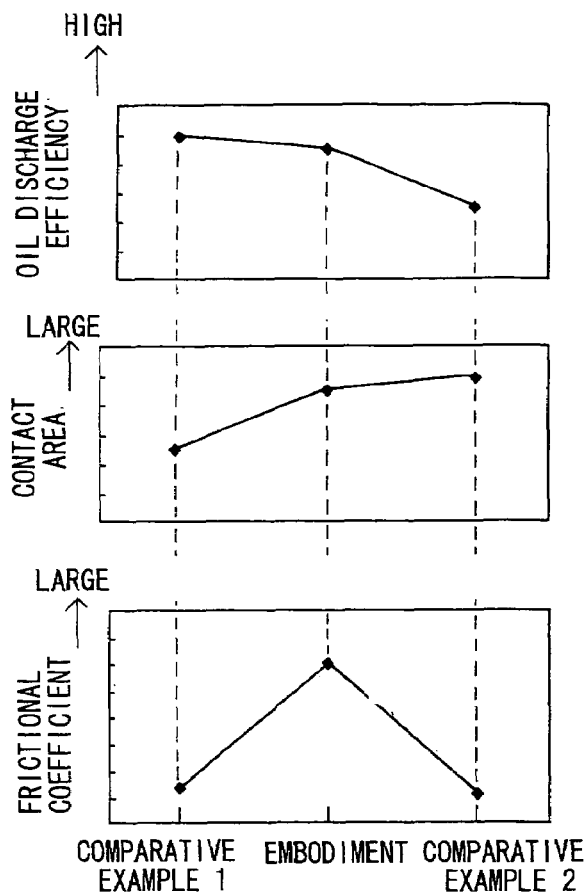
FIG. 6A
FIG. 6B
FIG. 6C
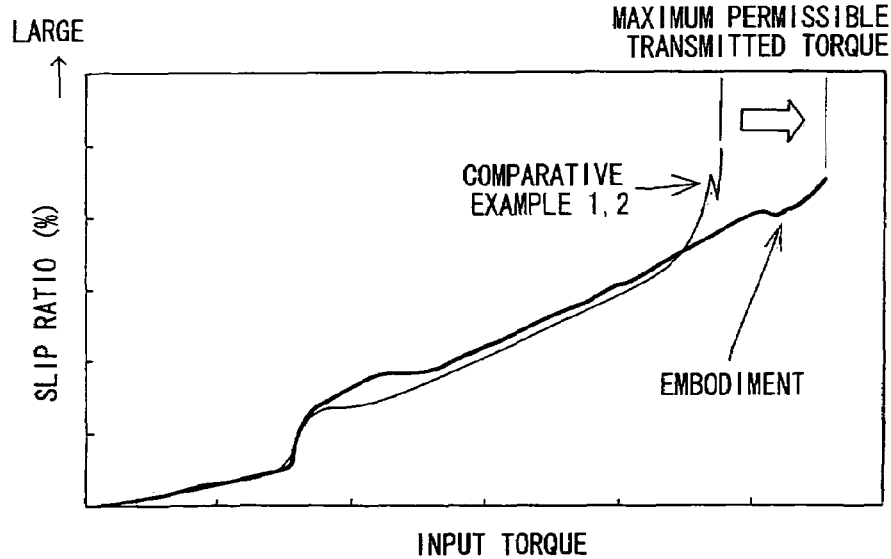
FIG. 7

METAL V-BELT

FIELD OF THE INVENTION

This invention relates to a plurality of belt elements constituting a metal V-belt for a continuously variable transmission.

BACKGROUND OF THE INVENTION

Tokkai Hei-11-125313 published by the Japan Patent Office in 1999 discloses a metal V-belt for a continuously variable transmission. The belt elements of the metal belt of this prior art comprise a plurality of threads and grooves in a flank which is a section at which the belt element makes contact with the pulley disk. This arrangement improves the discharge characteristics of lubrication oil provided between the belt elements and a pulley disk.

In the prior art, when the height (h) of the threads is reduced by long-term use to between 30-70% of an initial height, the effective area of contact between the pulley disk and the flank corresponds to 40 to 60% of the area of the flank. It is preferred that the plurality of threads provided in the flank has a sinusoidal profile (in the shape of a sine curve). During an initial period of use of the belt elements, the effective contact surface area is low and initial wear on the threads progresses rapidly and easily. In this manner, a state of quasi-equilibrium is reached in a relative rapid manner in which the effective contact surface area is of the order of 50%.

SUMMARY OF THE INVENTION

Consequently friction between the belt elements and the pulley disk is low until wear results in an increase in the effective contact surface area. This means that the permissible torque of the continuously variable transmission is insufficient during an initial period of use.

It is therefore an object of this invention to provide a metal belt element which generates a high level of friction and which is stable from initial use.

In order to achieve the above object, an element for use in an annular metal belt is disclosed, the annular metal belt transmitting torque between two pulleys each having a V-shaped groove, the element comprising a flank capable of making frictional contact with the V-shaped groove for transmission of torque. The flank comprises a plurality of threads disposed substantially parallel to one another and having a slight height relative to a dimension of the flank, wherein the top section of each thread is substantially planar.

The flank comprises a surface profile characterized in that: at a depth Y in a range from 0 to 1.2 μm, the total sectional area of the plurality of threads reaches 10% of the occupied area of the flank; and at a depth Y in a range from 0 to 4.8 μm, a total sectional area of the plurality of threads reaches 40% of the occupied area of the flank. Herein the depth Y is measured from the top point of a highest thread and the sectional area of the plurality of threads is perpendicular to a direction of depth. A bearing ratio curve obtained from the surface profile of the flank is positioned in a range defined by a function of $Y(\mu m)=3.3333X^3-2.3333X^2+0.6667X-0.0267$ and a function of $Y(\mu m)=-8.3333X^3+20.833X^2+3.3333X+0.6667$, where X is given by (total sectional area of the plurality of threads at a depth $Y(\mu m)$/ (occupied area of the flank).

The details as well as other features and advantages of this invention are set forth in the remainder of the specification and are shown in the accompanying drawings.

BRIEF DESCRIPTION OF THE DRAWINGS

FIG. 4A is a graph of a roughness curve. FIG. 4B is a graph of a bearing ratio curve.

FIG. 6A is a graph showing the oil discharge characteristics of comparative examples 1 and 2 and the discharge characteristics of the embodiment.

FIG. 6B is a graph showing the contact surface area of comparative examples 1 and 2 and the contact surface area of the embodiment.

FIG. 6C is a graph showing the frictional coefficient of comparative examples 1 and 2 and the frictional coefficient of the embodiment.

FIG. 7 is a graph showing the slip ratio in a metal belt according to comparative examples 1 and 2 and the embodiment.

DESCRIPTION OF THE PREFERRED EMBODIMENTS

Figure 1:
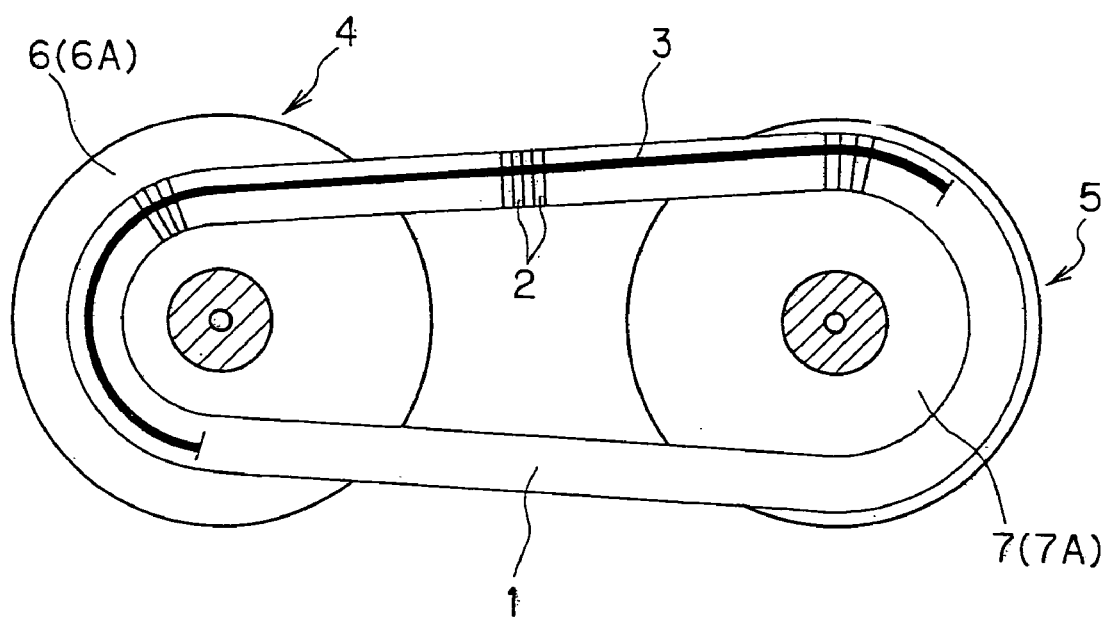
FIG. 1 is a schematic sectional side view of a continuously variable transmission provided with a metal belt according to an embodiment. Herein elements and rings are partially shown.

Referring to FIG. 1 of the drawings, a metal belt 1 comprises a plurality of metal elements in alignment and rings 3 retaining the plurality of elements 2. A belt-type continuously variable transmission comprises a metal belt 1, a drive pulley 4 and a driven pulley 5. The drive pulley 4 comprises a V-shaped groove 6A defined by a pair of opposed conical faces 6 which undergo relative displacement in an axial direction. The driven pulley 5 comprises a V-shaped groove 7A defined by a pair of opposed conical faces 7 which undergo relative displacement in an axial direction. The metal belt 1 is wound in the V-shaped groove 6A of the drive pulley 4 and the V-shaped groove 7A of the driven pulley 5. Torque from the drive pulley 4 is transmitted to the driven pulley 5 by a compressive force between elements 2 coming into close contact with one another. Each element 2 is engaged with the V-shaped grooves 6A and 7A and is locked by the tension of the rings 3 functioning as the main body of the belt.

Figure 2A:
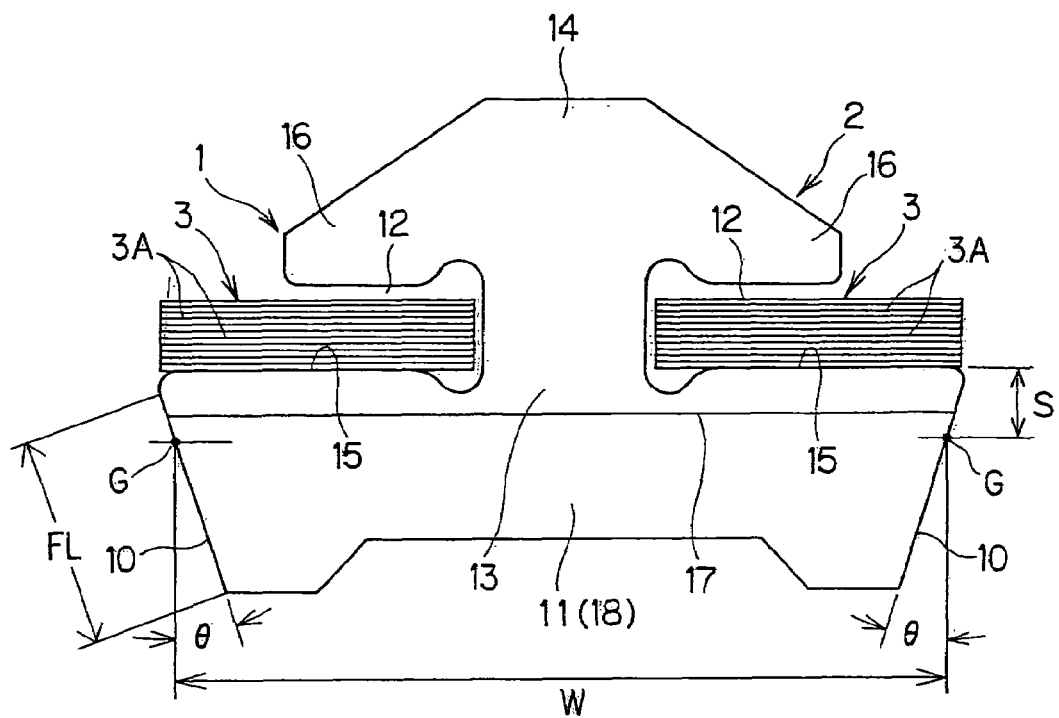
FIG. 2A is a sectional front view of a belt element employing the embodiment.

As shown in FIG. 2A, the elements 2 comprise a body 11, a neck 13, and a head 14 connected to the body 11 through the neck 13. A pair of ring receptor grooves 12 is formed between the body 11 and the head 14. The body 11 is provided with a pair of tapering and substantially flat flanks 10 which incline to form the contact faces with the V-shaped grooves 6A, 7A of the pulleys 4, 5. The ring receptor grooves 12 are defined by the ear section 16 formed in the head 14, the saddle face 15 of the body 11 and neck section 13. The metal rings 3 are fitted to the ring receptor groove 12. The rings 3 are formed by laminating several thin plate-shaped ring pieces 3A. In this manner, several hundred connected elements 2 function as a single metal belt 1. The body 11 is positioned on the inner periphery of the ring 3 and the head 14 is positioned on the outer periphery of the ring 3.

Figure 2B:
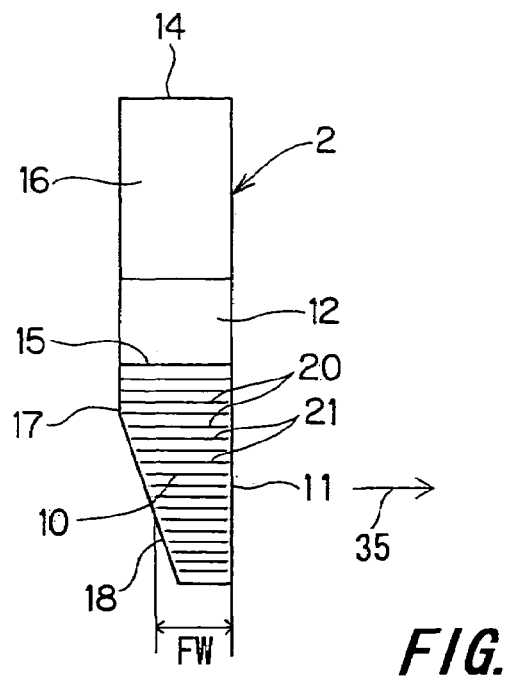
FIG. 2B is a side view of the belt element.

Referring to FIG. 2B, the body 11 is cut by the inclined face 18 in the section of the figure below a rocking edge 17. In this manner, respective bodies 11 do not interfere with each other below the rocking edge 17. The element 2 moves together with the rotation of the pulley with the flank 10 contacting the V-shaped grooves 6A, 7A of the pulleys 4, 5. It is also preferred for respective bodies 11 to come into mutual contact through the rocking edge 17.

The principal dimensions affecting the transmitted torque between the flank 10 and the pulleys 4, 5 are the reference interval W of the flank 10 on the right and left of the body 11, the vertical interval S from the saddle face 15 to a point G defining the reference interval W, and the angle of inclination θ of the flank 10. Consequently these dimensions must be achieved by machining in a very accurate manner.

Figure 3:
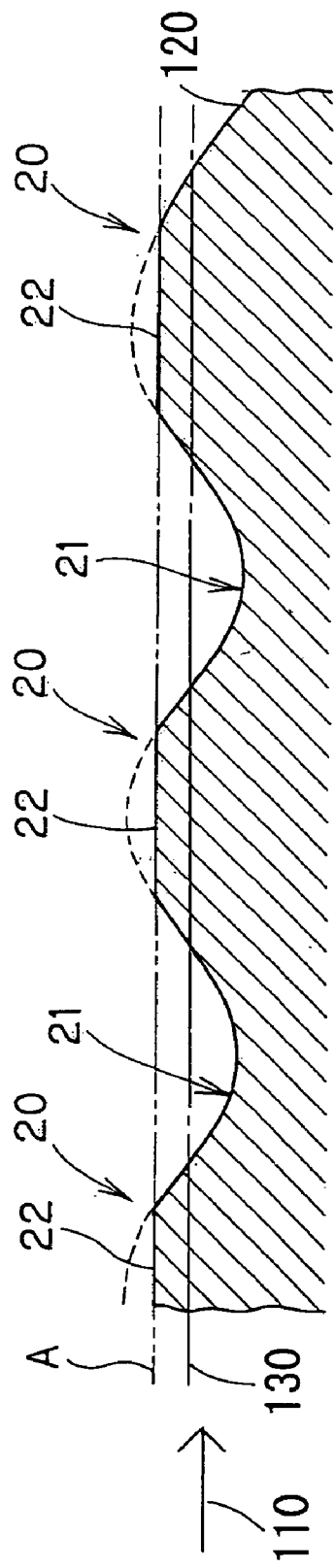
FIG. 3 is a partial enlarged sectional view of a flank of a belt element employing the embodiment.

Although the flank 10 is overall a substantially flat face, an indentation is provided which has a slight height/depth in comparison to the dimensions (length FL and width FW) of the flank. More precisely, the flank 10 is provided with a plurality of straight threads 20 which extend substantially parallel to one another. As shown in FIG. 3, a groove 21 is formed between adjacent threads 20, and thus the threads 20 and the grooves 21 are alternately disposed. The thread 20 extends substantially in the direction of movement of the element 2 and substantially in the direction of the width of the flank 10, as shown in FIG. 2B. Since the thread 20 is disposed across the entire width of the flank 10, the length of the thread 20 is substantially equal to the width FW of the flank 10 at a location where the thread 20 is disposed. Referring to FIG. 3, a flat contact face 22 with a surface roughness of 1 μm (micrometer) is formed on the tip of each thread 20. A plurality of contact faces 22 are positioned substantially on one common face "A" in a coplanar relationship. Each contact face 22 makes contact with the pulley disks 6, 7. The grooves 21 between the threads 20 function as a discharge groove for lubrication oil discharged from sections coming into contact when the contact face 22 of the threads 20 make contact with the pulley disks 6, 7.

The height of the thread 20 with reference to the bottom of the groove 21 is less than or equal to 100 μm (micrometers) and is preferably between 30-40 μm. The pitch between adjacent threads 20 is approximately 0.2 mm (millimeters). The height of the threads 20 is extremely small relative to the width FW (which may be the average width) or length FL of the flank.

The flat contact face 22 is formed on the top section of the thread 20 with a substantially constant height. However the face 22 may be formed with slight local variations in the height. For example, as long as the contact face of the thread 20 is generally flat, the thread 20 may be slightly swollen when viewed from a lateral direction 110 which is vertical to the longitudinal direction of the thread 20. Furthermore although the contact face 22 is generally flat, the central section of the contact face 22 may be slightly raised in the longitudinal direction of the thread 20.

When the element 2 is formed by using a punch press, an indentation having a pitch of 0.2 mm and a depth of 30-40 μm may be formed on a die face corresponding to the flank 10. Preferably a highly accurate press (fine press) is used. Furthermore the thread 20 and the groove 21 can be also formed by a cutting (or machining) operation using a cutting tool having the same shape as the thread 20 and the groove 21.

The element 2 formed by a punch press may have wave-shaped threads 20 as shown by the dotted line in FIG. 3. In this case, the contact face 22 is formed by flattening the threads 20. The flattening process may be performed by machining, or by using a flattening press or by grinding using a grindstone. All the flattening processing methods above are adapted so that the surface roughness of the contact face 22 is 1 μm.

When threads 20 of the element 2 formed by cutting do not have a contact face 22, it is necessary to perform flattening processing in the same manner as an element formed using a punch press. However if a flat section forming the contact face 22 is provided on a cutting tool, in other words, when the cutting tool has the same shape as the threads provided with a contact face 22, it is not necessary to perform a flattening process for the contact face.

The surface profile of the flank 10 of the element 2 has a bearing ratio curve F(X) based on the DIN4776 standard. An exemplary bearing ratio curve F(X) is shown by FIGS. 4A-4B. The bearing ratio curve is sometimes referred to as an Abbott curve and is used in order to obtain parameters characterizing a surface profile. For example, this bearing ratio curve is described in U.S. Pat. No. 6,641,471 granted on 4 Nov. 2003 in Pinheiro at al.

In this embodiment a plurality of threads 20 are disposed parallel to one another. Therefore, the bearing ratio X expresses the sum of the cross sectional area of the threads when the threads are sliced at a predetermined depth parallel to the center line 130 described below. Thus the cross sectional area of the threads is perpendicular to the direction of depth. The depth Y is measured using the top point of the highest thread as a reference. The top point is positioned on a contact face 22.

Figure 4C:
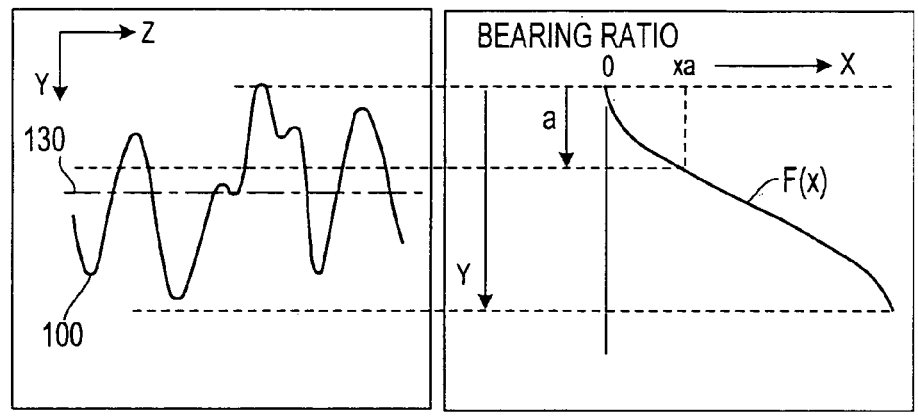
FIG. 4C is a cut-away view schematically showing a cross-sectional area and a reference area.
Figure 4C:
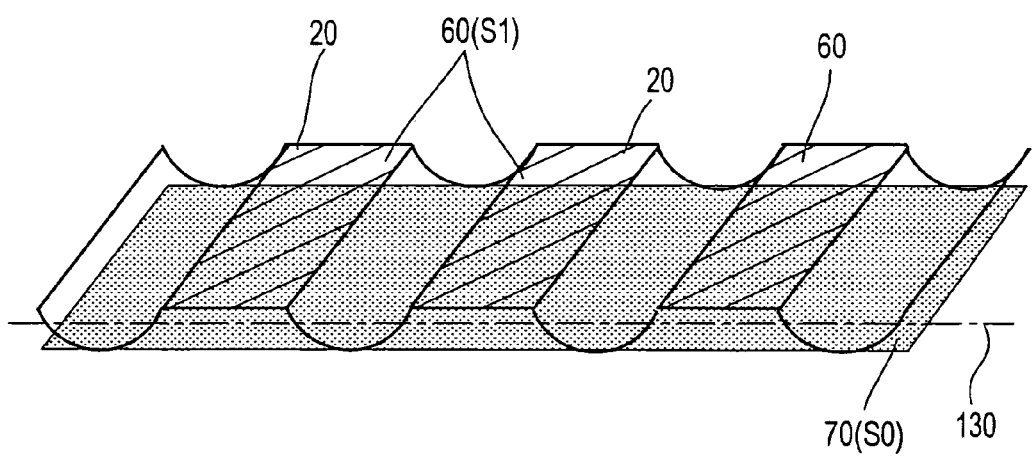

The bearing ratio X is given by S1/S0. Herein S1 is the total cross sectional area at a depth Y of the plurality of threads 20. The reference sectional area S0 is the total sectional area at the bottom of the deepest groove. In this embodiment, the reference sectional area S0 is actually the occupied area of the flank 10 (area specific to the flank 10) or more precisely the projected area of the flank 10 in the direction of the depth. FIG. 4C shows the reference area 70 and the cross sectional area 60 of the threads 20. The reference area 70 and the cross sectional area 60 are parallel to the longitudinal direction of the center line 130 and the thread 20. At the bottom of the deepest groove, the bearing ratio X reaches 1.0 (100%). At the top point of the highest thread (Y=0), the bearing ratio X is 0.0 (0%).

The bearing ratio curve F(X) plots the depth Y (μm) from the top point of the highest thread with respect to the bearing ratio X. For example, a depth a (μm) having a sectional area of Xa×100(%) of the reference sectional area is obtained from the bearing ratio curve. A bearing ratio curve F(X) shown in FIG. 4B is obtained for the surface profile having a roughness curve of 100 as shown in FIG. 4A. The roughness curve 100 expresses the surface profile in a specific direction. The central line is determined so that the area of the section surrounded by the central line 130 and the roughness curve 100 become equal on both sides of the central line. In this embodiment, since a plurality of threads 20 are disposed in parallel, the roughness curve 120 (refer to FIG. 3) in the lateral direction 110 vertical to the longitudinal direction of the thread 20 most clearly shows the characteristics of the surface profile of the flank 10. Thus the central line 130 can be obtained from the roughness curve 120 in the lateral direction 110.

Figure 5:
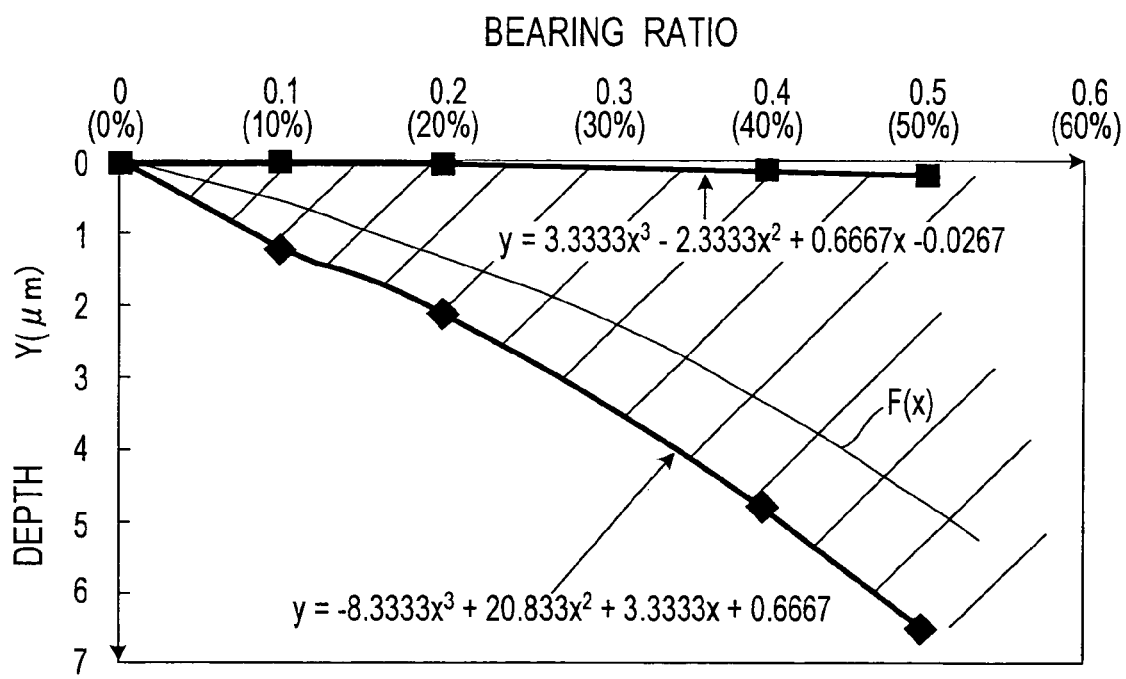
FIG. 5 is a graph of a bearing ratio curve for the surface profile of a flank employing the embodiment.

Referring to FIG. 5, the bearing ratio for the flank 10 in this embodiment increases with an increase in the depth Y, i.e. the total sectional area of the plurality of threads 20 increases with an increase in the depth Y The total sectional area of the plurality of threads 20 reaches 10% of the occupied area of the flank 10 at a depth Y which is in a range from 0 to approximately 1.2 µm. In other words, the total sectional area of the plurality of threads 20 is greater than 10% of the occupied area of the flank 10 when the depth Y is greater than 1.2 µm. The total sectional area of the threads 20 reaches 40% of the occupied area S0 of the flank 10 at a depth Y which is in a range from 0 to approximately 4.8 µm. In other words, when the depth Y is greater than 4.8 µm, the total sectional area of the threads 20 is greater than 40% of the occupied area S0 of the flank 10. The bearing ratio curve F(X) is positioned in the hatched range shown in FIG. 5. More precisely, it is positioned in the range having an upper limit of $Y=3.3333X^3-2.3333X^2+0.6667X-0.0267$ and a lower limit of $Y=-8.3333X^3+20.833X^2+3.3333X+0.6667$. Since the manufacturing accuracy of the surface is 1 µm, it should be noted that the bearing ratio curve F(X) and the limits slightly vary in response to the manufacturing accuracy.

The bearing ratio curve F(X) approaches the lower limit in response to decreases in the surface area of the contact surface 22 formed on the top of the thread 20 and approaches the upper limit in response to increases in the surface area of the contact surface 22 formed on the top of the thread 20.

FIG. 6A shows the discharge efficiency of lubrication oil from the contact sections positioned between the pulley disks 6, 7 and the flank 10. FIG. 6B is a graph showing the contact area of pulley disks 6, 7 and the flank 10. FIG. 6C is a graph showing the frictional coefficient between the pulley disk 6, 7 and the flank 10. Comparative example 1 shows the elements 2 provided with tapering flanks 10 in which the top section of the threads 20 is not flat. Comparative example 2 shows the elements 2 provided with flanks 10 having a completely flat surface completely lacking threads 20.

Figure 8:
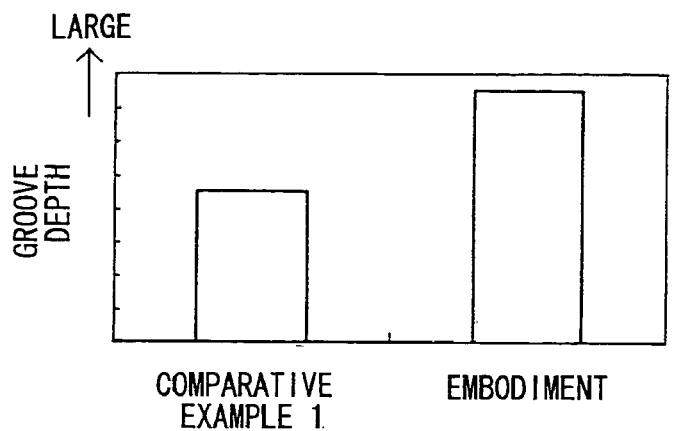
FIG. 8 is a graph showing groove depth of the flank in comparative example 1 and the embodiment after a predetermined period of use.

In comparative example 1, the discharge efficiency of lubrication oil between the pulley disks 6, 7 and the flank 10 is high (refer to FIG. 6A). However comparative example 1 does not display a sufficient contact surface area between the flank 10 and the pulley disks 6, 7 (refer to FIG. 6B). Friction between the pulley disks 6, 7 and the flank 10 determined by the synergistic effect of the discharge efficiency and the contact surface area is low (refer to FIG. 6C). As shown by FIG. 7, the transmitted torque of the element 2 is limited to a maximum permissible transmitted torque by increases in the slip ratio. The maximum permissible transmitted torque in comparative example 1 is small relative to this embodiment. As shown in FIG. 8, in comparison to this embodiment, the flank 10 of comparative example 1 tends to undergo wear resulting from the high contact surface pressure since the top of the thread 20 projects. Consequently the element 2 in comparative example 1 does not display sufficient durability.

In comparative example 2, the contact surface area of the pulley disks 6, 7 and the flank 10 is large in comparison to this embodiment (refer to FIG. 6B). Since the contact surface pressure is low, wear on the flank 10 decreases and durability is good. However this has an adverse effect on the discharge efficiency for lubrication oil between the pulley disk 6, 7 and the flank 10 (refer to FIG. 6A). As a result, in comparative example 2, the frictional coefficient between the pulley disks 6, 7 and the flank 10 is small in comparison to this embodiment (refer to FIG. 6C).

In the flank 10 according to this embodiment, the contact surface area between the pulley disks 6, 7 is smaller than that displayed in comparative example 2 (refer to FIG. 6B). However in comparison to comparative example 1, the contact surface area of the flank 10 in this embodiment is conspicuously large. As a result, in this embodiment, the flank 10 improves the contact stability between the element 2 and the pulley disks 6, 7. Friction undergoes a large increase relative to comparative examples 1 and 2 (refer to FIG. 6C). Furthermore in this embodiment, since the contact surface pressure decreases, it is possible to decrease wear in comparison to comparative example 1. The discharge efficiency of the lubrication oil in this embodiment is slightly inferior to comparative example 1. However, since there is still a sufficient number of discharge grooves 21, the discharge efficiency of the lubrication oil do not undergo a substantial decrease (refer to FIG. 6A). The maximum permissible transmitted torque is improved in this embodiment as shown in FIG. 7 due to the fact that friction is improved relative to comparative examples 1 and 2 (refer to FIG. 6C). Thus it is possible to improve friction characteristics and to improve durability by reducing wear.

Figure 9:
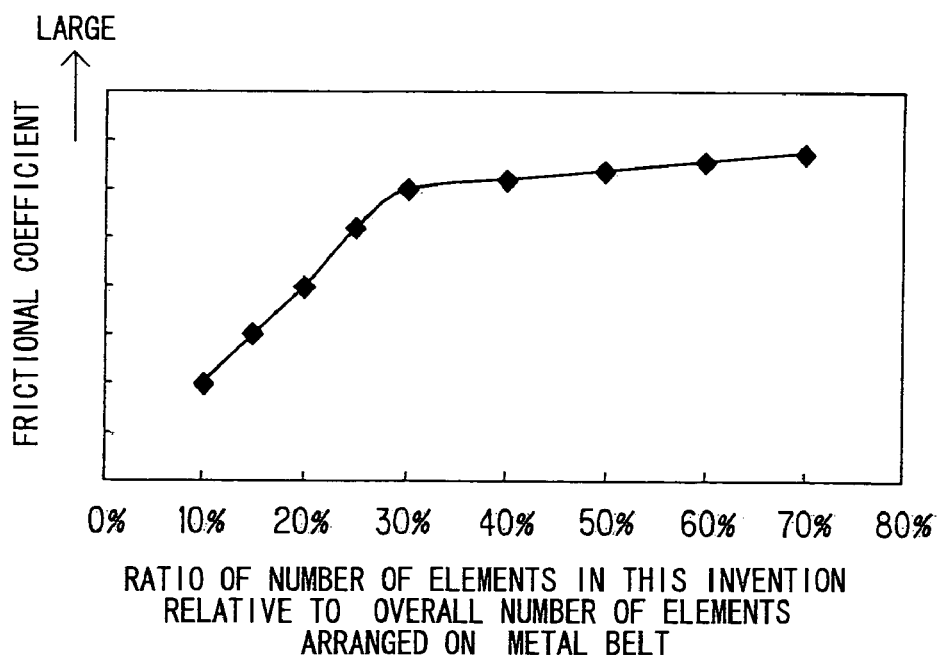
FIG. 9 is a graph of a coefficient of friction between the pulley disk and the metal belt with respect to the ratio of the number of elements according to the embodiment to the total number of elements.

It is preferred that all elements in the metal belt 1 are elements 2 according to this invention, which are provided with a flank 10 where each thread 20 has a flat contact face 22. However, in the metal belt 1, elements 2 according to this invention may be provided as every second element or every third. FIG. 9 shows experimental results regarding the relationship between the transmitted torque (or frictional coefficient of the metal belt 1) and the ratio of the number of elements in this invention relative to the overall number of elements arranged on the metal belt 1. These results show that it is possible to obtain sufficient transmitted torque by mixing elements 2 according to this invention with elements 2 from the prior art at a percentage of at least greater than or equal to 30%. In this manner, it is no longer necessary to perform highly accurate machining of all elements 2 and thus it is possible to reduce machining costs for the elements 2. If the element disclosed in comparative example 1 is selected as the prior-art element 2, during an initial period of use of the metal belt 1, torque transmission is performed by the element 2 according to this invention. In this case it is possible to gradually increase transmitted torque as wear progresses on the element 2 from comparative example 1.

Although the invention has been described above by reference to certain embodiments of the invention, the invention is not limited to the embodiments described above.

For example, in this embodiment, the metal belt 1 is provided with ring receptor grooves 12 on the left and the right of the element 2. However a single ring receptor groove 12 may be provided in the center of the element 2.

Modifications and variations of the embodiment described above will occur to those skilled in the art, in light of the above teachings. The scope of the invention is defined with reference to the following claims.

The entire contents of Japanese Patent Application P2003-60516 (filed Mar. 6, 2003) and Japanese Patent Application P2003-159150 (filed Jun. 4, 2003) are incorporated herein by reference.

What is claimed is:

1. An element for use in an annular metal belt, the annular metal belt transmitting torque between two pulleys each having a V-shaped groove, the element comprising a flank capable of making frictional contact with the V-shaped groove for transmission of torque;

wherein the flank comprises a plurality of threads disposed substantially parallel to one another and having a height less than a width or length of the flank, the top section of each thread being substantially planar;

wherein the flank comprises a surface profile;

wherein, at a depth Y of 1.2 μm, a total sectional area of the plurality of threads reaches at least 10% of the occupied area of the flank; and, at a depth Y of 4.8 μm, a total sectional area of the plurality of threads reaches at least 40% of the occupied area of the flank; wherein the depth Y is measured from a top point of a highest thread and wherein a sectional area of the plurality of threads is perpendicular to a direction of depth; and wherein a bearing ratio curve obtained from the surface profile of the flank is positioned in a range defined by a function of $Y(\mu m)=3.3333X^3-2.3333X^2+0.6667X-0.0267$ and a function of $Y(\mu m)=-8.3333X^3+20.833X^2+3.3333X+0.6667$, where X is given by (total sectional area of the plurality of threads at a depth $Y(\mu m)$)/(occupied area of the flank).

2. The element for use in an annular metal belt as defined in claim 1, wherein a total sectional area of the plurality of threads at a depth Y from a top point of a highest thread increases as the depth Y increases.

3. The element for use in an annular metal belt as defined in claim 1, wherein a height of the plurality of threads of the flank is between 30-40 micrometers.

4. The element for use in an annular metal belt as defined in claim 1, wherein a pitch of the threads is approximately 0.2 millimeters.

5. The element for use in an annular metal belt as defined in claim 1, wherein the plurality of threads of the flank extend substantially in a direction of movement of the element.

6. The element for use in an annular metal belt as defined in claim 1, wherein a length of each thread is substantially equal to a width of the flank at a location where each thread is disposed.

7. A metal belt for transmitting torque between two pulleys each having a V-shaped groove, comprising:

a plurality of connected elements, wherein the plurality of connected elements comprises a plurality of first elements and a plurality of second elements, wherein the number of first elements is greater than or equal to 30% of the overall number of the plurality of connected elements;

wherein each first element comprises a flank capable of making frictional contact with the V-shaped groove for transmission of torque;

wherein the flank comprises a plurality of threads disposed substantially parallel to one another and having a height less than a width or length of the flank, the top section of each thread being substantially planar;

wherein the flank comprises a surface profile;

wherein, at a depth Y of 1.2 μm, a total sectional area of the plurality of threads reaches at least 10% of the occupied area of the flank; and, at a depth Y of 4.8 μm, a total sectional area of the plurality of threads reaches at least 40% of the occupied area of the flank; wherein the depth Y is measured from a top point of a highest thread and wherein a sectional area of the plurality of threads is perpendicular to a direction of depth; and wherein a bearing ratio curve obtained from the surface profile of the flank is positioned in a range defined by a function of $Y(\mu m)=3.3333X^3-2.3333X^2+0.6667X-0.0267$ and a function of $Y(\mu m)=-8.3333X^3+20.833X^2+3.3333X+0.6667$, where X is given by (total sectional area of the plurality of threads at a depth $Y(\mu m)$)/(occupied area of the flank).

8. An element for use in an annular metal belt, the annular metal belt transmitting torque between two pulleys each having a V-shaped groove, the element comprising a flank capable of making frictional contact with the V-shaped groove for transmission of torque;

wherein the flank comprises a plurality of threads disposed substantially parallel to one another and having a height less than a width or length of the flank, the top section of each thread being substantially planar;

wherein the flank comprises a surface profile; and wherein a bearing ratio curve obtained from the surface profile of the flank is positioned in a range defined by a function of $Y(\mu m)=3.3333X^3 2.3333X+0.6667X-0.0267$ and a function of $Y(\mu m)=-8.3333X^3+20.833X^2+3.3333X+0.6667$, where X is given by (total sectional area of the plurality of threads at a depth $Y(\mu m)$)/(occupied area of the flank).

* * * * *